(12) United States Patent
Steegmann

(10) Patent No.: US 11,214,235 B2
(45) Date of Patent: Jan. 4, 2022

(54) SECURITY SYSTEM FOR A VEHICLE

(71) Applicant: Huf Hülsbeck & Fürst GmbH & Co. KG, Velbert (DE)

(72) Inventor: Dennis Steegmann, Velbert (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

(21) Appl. No.: 16/862,589

(22) Filed: Apr. 30, 2020

(65) Prior Publication Data

US 2020/0346618 A1 Nov. 5, 2020

(30) Foreign Application Priority Data

Apr. 30, 2019 (DE) ...................... 10 2019 111 157.9

(51) Int. Cl.
*B60R 25/24* (2013.01)

(52) U.S. Cl.
CPC ...... *B60R 25/245* (2013.01); *B60R 2325/101* (2013.01); *B60R 2325/103* (2013.01); *B60R 2325/105* (2013.01); *B60R 2325/106* (2013.01); *B60R 2325/205* (2013.01)

(58) Field of Classification Search
CPC ............ B60R 25/245; B60R 2325/101; B60R 2325/103; B60R 2325/105; B60R 2325/106; B60R 2325/205; B60R 25/246; G07C 2009/00555; G07C 2209/63; G07C 9/00309; G07C 2209/64; H04W 4/40; H04W 4/46; H04W 4/02; H04W 4/023; H04W 4/029
USPC .............................................. 340/5.61, 5.72
See application file for complete search history.

(56) References Cited

U.S. PATENT DOCUMENTS

| | | | |
|---|---|---|---|
| 10,207,677 B1 * | 2/2019 | Lazarini | B60R 25/209 |
| 10,521,984 B1 * | 12/2019 | Johansson | G07C 9/00309 |
| 2003/0162528 A1 * | 8/2003 | Juzswik | G07C 9/00182 455/411 |
| 2017/0248436 A1 * | 8/2017 | Goldman-Shenhar | H04W 76/14 |
| 2017/0303080 A1 * | 10/2017 | Stitt | G06F 21/35 |
| 2017/0327083 A1 * | 11/2017 | Verkin | G07C 9/00 |
| 2018/0025639 A1 | 1/2018 | Lin | |
| 2018/0174452 A1 | 6/2018 | Draper et al. | |
| 2018/0213355 A1 * | 7/2018 | Smith | H01Q 21/205 |

FOREIGN PATENT DOCUMENTS

WO   WO 2016/061804   4/2016

OTHER PUBLICATIONS

Europaeischer Recherchenbericht und die Stellungnahme zur Europaeischen Recherche [European Search Report and the European Search Opinion] dated Sep. 14, 2020 From the European Patent Office Re. Application No. 20171748.5 and Its Summary in English. (11 Pages).

* cited by examiner

Primary Examiner — Edwin C Holloway, III

(57) ABSTRACT

The invention relates to a security system (1) for a vehicle (2), in particular for integration into the vehicle (2), for locating a mobile device (10) in a surrounding area of the vehicle (2), comprising
a transceiver arrangement (100) for providing vehicle communication (FK) of the vehicle (2) with at least one other vehicle (2') in the surrounding area,
a processing arrangement (200) for performing the localization of the mobile device (10) at least partially on the basis of the vehicle communication (FK).

20 Claims, 7 Drawing Sheets

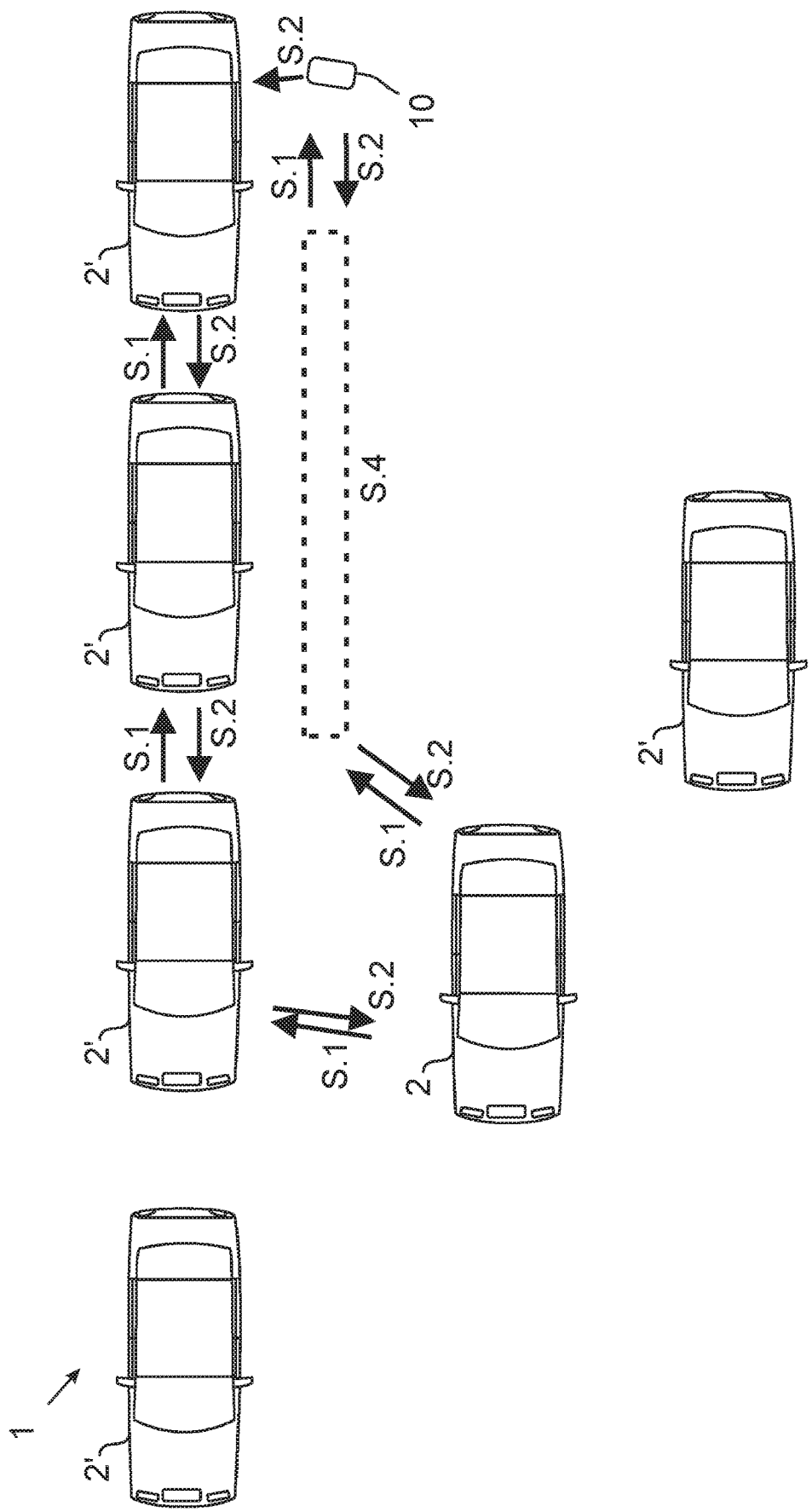

SECURITY SYSTEM FOR A VEHICLE

RELATED APPLICATION

This application claims the benefit of priority of German Patent Application No. 10 2019 111 157.9 filed on Apr. 30, 2019, the contents of which are incorporated herein by reference in their entirety.

FIELD AND BACKGROUND OF THE INVENTION

The present invention relates to a security system for a vehicle. Furthermore, the invention relates to a vehicle and a method for locating a mobile device through a vehicle.

Various possibilities are known from the state of the art for the electronic authentication of an identification device (ID transponder) in a vehicle. It is also known from the state of the art that the authentication can be additionally secured in order to counter security risks, such as the so-called "relay station attack". The authentication mechanism used can, for example, include transmitting an alarm signal from the vehicle to the ID transponder and receiving a response signal from the ID transponder in response thereto. The additional security can now consist in determining the distance to the ID transponder.

A disadvantage of the known solutions is that the authentication itself and/or the protection can be disturbed by various influences from the vehicle's surrounding area. For example, interference is conceivable by reflections of electromagnetic waves or rays (reflection of the radio signal), which are caused by other vehicles in the surrounding area.

BACKGROUND OF THE INVENTION

It is therefore an object of the present invention to at least partially eliminate the disadvantages described above. In particular, it is an object of the present invention to enable an improved authentication and/or protection of the electronic authentication of the identification device on a security system of the vehicle. In doing so, preferably the possibilities of manipulation of the electronic authentication of the identification device on the security system of the vehicle (hereinafter only briefly referred to as "authentication") should be reduced or even avoided.

The above object is solved by a security system with the characteristics of independent system claim, a vehicle with the characteristics of independent device claim and a method with the characteristics of independent method claim. Further features and details of the invention result from the respective dependent claims, the description and the drawings. Features and details which are described in connection with the security system according to the invention are of course also valid in connection with the vehicle according to the invention as well as the method according to the invention, and vice versa, so that with regard to the disclosure of the individual aspects of the invention reference is or can always be made to each other.

The object is solved in particular by a security system for a vehicle (hereinafter also referred to as "master vehicle"). It may be provided that the security system is configured for integration into the vehicle, preferably to be permanently attached to the vehicle. In other words, the security system can form an integral part of the vehicle after installation in the vehicle.

The security system may also be configured to locate a mobile device in a vehicle's surroundings. The mobile device is, for example, an identification device (ID transponder) or a mobile radio device such as a smartphone or the like, which serves to activate a security-relevant function on the vehicle. The following components of the security system may be provided:
 at least one (in particular electronic) transceiver arrangement for providing vehicle communication of the vehicle with at least one further vehicle (hereinafter also referred to as "slave vehicle") in the surrounding area (of the master vehicle), in particular for determining at least one item of reception information on the basis of the vehicle communication,
 at least one (in particular electronic) processing arrangement for performing the location of the mobile device at least partially on the basis of the vehicle communication, in particular on the basis of the reception information.

The components may optionally be configured as part of a vehicle electronic system, preferably part of a control unit for the vehicle. The processing arrangement comprises, for example, a microcontroller or processor or the like to perform digital processing for localization. For this purpose, the processing arrangement can, for example, receive signals, in particular data in the form of reception information, from the transceiver arrangement, whereby the signals can be specific to vehicle communication and/or device communication. The data can, for example, be distance information to the other vehicle and/or to the mobile device.

The transceiver arrangement may have at least one of the following transceiver components for providing, in particular performing, vehicle communication in the form of radio communication:
 at least one antenna for mounting on the vehicle,
 at least one transceiver for receiving and transmitting a communication signal (in the form of a radio signal), which can be in signal connection with the antenna for this purpose
 further electronics, preferably with a modulation unit and/or a microcontroller and/or the like, for providing the communication technology for vehicle communication, which for this purpose can be in signal connection with the transceiver.

The transceiver arrangement may have at least one or at least two or at least three transceiver unit(s), each with at least one of the aforementioned transceiver components, preferably for providing different communication technologies.

The security system may also be configured to perform authentication by a communication of the transceiver with the mobile device. To ensure authentication, a distance measurement and/or position determination of the mobile device by means of ToF (time-of-flight; i.e. signal transmit time measurement) or via UWB (ultra-wideband) or BLE (Bluetooth Low Energy) or comparable communication technology, which can also be provided by the transceiver arrangement. In this way it can be ensured that the mobile device does not exceed a maximum distance from the vehicle. However, strong fluctuations and impairments of the localization can be caused by reflections of the communication signal used for communication with the aforementioned communication technologies. Such reflections are caused, for example, by reflective structures, e.g. other vehicles in the surrounding area of the vehicle.

Within the scope of the invention, an improvement of conventional solutions is advantageously achieved by the fact that the vehicle (in the sense of a "master", and therefore also referred to in the following as "master vehicle") is networked with at least one other vehicle (in the aforementioned sense also referred to as "slave vehicle") in the surrounding area. The master vehicle (also: main vehicle) is thereby the vehicle which has the aforementioned transceiver arrangement and to which the mobile device can, if necessary, legitimately authenticate itself in order to initiate a security-relevant function. The security-relevant function is, for example, the release of an access to the master vehicle through authentication. The release of the access can include the unlocking of the vehicle, optionally additionally the opening of at least one door and/or the release of the engine start. The perimeter can be the immediate surrounding area of the master vehicle, such as a parking lot or a street. In this way the master vehicle can use a plurality, in particular an array, of receivers which are available for vehicle communication.

The slave vehicles (also: secondary vehicles) can communicate with the master vehicle via the vehicle communication, e.g. send a response in response to a request by the master vehicle. This response shall include in particular at least one piece of device information, i.e. information about the mobile device.

For example, the device information may include a device response of the mobile device, which is transmitted via the response from the at least one slave vehicle to the master vehicle using the vehicle communication.

A device response in the sense of the invention comprises, for example, data of a response signal, in particular a radio signal, which is transmitted in response to the receipt of an alarm signal of the master vehicle and/or the slave vehicle by the mobile device. For this purpose, the alarm signal is transmitted, for example, via UWB or Bluetooth or BLE or HF (high frequency) or LF (low frequency) by the master and/or slave vehicle, optionally also via the device communication, in particular as a broadcast signal. The alarm signal can then be received by the mobile device, causing the mobile device to send the response signal. In terms of content, the device response can include information specific to the authentication, for example an authentication code or the like. Furthermore, the device response can also include information specific to a distance and/or position of the mobile device. This information is for example a signal strength with which the alarm signal was received by the mobile device or a result of a ToF analysis of the alarm signal.

It may also be possible that the slave vehicle itself performs a localization of the mobile device and provides information about this localization. Therefore, the device information can also include this localization information determined by the slave vehicle (hereinafter also referred to as localization information). This information can be in the form of information about a device communication that the slave vehicle provides with the mobile device, for example, to receive the device response from the mobile device. This information can also include a result of a distance measurement and/or position determination of the mobile device by the slave vehicle. This distance measurement and/or position determination can preferably be performed using the device communication of the slave vehicle and/or the device response received by the slave vehicle. The distance measurement and/or position determination can also be performed by measuring, for example, a signal strength or signal delay (ToF, time of flight) of the device response. The information about the localization can, for example, directly show the position and/or distance to the mobile device, or the measured values (such as signal strength or signal transmit time). As with GPS positioning, the accuracy of the localization can be improved by the use of several slave vehicles (i.e. participants in the vehicle communication), or a plausibility check of the localization of the mobile device can be enabled.

It is particularly advantageous if at least one of the other vehicles (slave vehicles) is a parked vehicle or is stationary and/or has a speed of 0 km/h. In this way, it is very reliably possible for the vehicle (master vehicle) to determine the position of the other vehicles using vehicle communication. In this case, information can be determined by the slave vehicle itself, such as measured values, to localize the mobile device in order to increase the accuracy of the localization. This averaging can take place over a certain period of time, which may be predefined or dynamically determined. The dynamic determination is performed, for example, as a function of at least one parameter which is specific to the reliability of the localization, such as a fluctuation and/or error characteristic of the measured values or the like.

It is also advantageous if the vehicle (in particular the vehicle as a master vehicle, in addition possibly also the at least one other vehicle, then as a slave vehicle) is configured as a motor vehicle, in particular as a hybrid vehicle or as an electric vehicle, preferably with a high-voltage vehicle electrical system and/or an electric motor. It may also be possible for this vehicle to be configured as a fuel cell vehicle and/or passenger vehicle and/or semi-autonomous or autonomous vehicle. Advantageously, this vehicle has the security system which enables authentication, e.g. through communication with the mobile device, in particular an identification device (ID transponder). Depending on the communication and/or the authentication, at least one function of the vehicle can be activated. If authentication of the mobile device is necessary for this purpose, the function can be a security-relevant function, such as unlocking the vehicle or enabling an engine start. Thus, the security system can also be configured as a passive access system, which initiates the authentication and/or activation of the function without active manual operation of the mobile device when the mobile device is detected approaching the vehicle. For this purpose, for example, the security system repeatedly sends an alarm signal which can be received by the mobile device when it is approaching and then triggers the authentication. The function can also involve the activation of vehicle lighting and/or the operation (opening and/or closing) of a flap (e.g. front or rear or side flap or door). For example, the vehicle lighting is automatically activated when the vehicle is approached and/or the flap is operated when a user gesture is detected.

It may be advantageous if, within the scope of the invention, the transceiver arrangement is also configured for direct device communication of the vehicle with the mobile device, preferably the processing arrangement being in signal connection, in particular data connection, with the transceiver arrangement in order to directly locate the mobile device on the basis of the device communication, in particular on the basis of the at least one piece of reception information determined by the device communication. For this purpose, the reception information can be transmitted from the transceiver arrangement to the processing arrangement, for example, via the signal connection. The device communication enables, for example, a transmission of authentication information for authentication from the mobile device to the vehicle. Furthermore, the device communication can also provide direct localization, for example, by means of information about the signal strength or the like. The authentication information and/or the information for localization can be provided via the at least one reception information for the processing arrangement in order to enable a reliable electronic localization by the processing arrangement.

It is also conceivable that the processing arrangement is in the signal connection, in particular data connection, with the transceiver arrangement in order to perform the vehicle communication, in particular using the at least one reception information, which was determined by the vehicle communication, at least one of the following functions for localization:

Plausibility check of the direct localization,
Supplementing and/or correcting the direct localization to increase the accuracy of the localization
Indirect location of the mobile device via the at least one other vehicle.

The at least one reception information can provide information of the directly performed device communication (such as the authentication information and/or the information for localization) as well as information of the vehicle communication for the processing arrangement. Like the mobile device in the case of device communication, in the case of vehicle communication one of the other vehicles is a direct communication participant for communication with the transceiver arrangement. The vehicle communication can be performed at least partially simultaneously or alternately and/or with a time offset to the device communication.

Device communication can be the usual form of authentication and/or securing of authentication where the communication between the mobile device and the vehicle is direct. Vehicle communication, on the other hand, is the communication between the master and the at least one slave vehicle in order to exchange information about the mobile device via this vehicle communication. In this way, improved localization of the mobile device and/or securing of the authentication and/or higher reliability in the authentication can be achieved.

It may also be possible for the transceiver arrangement to have at least one transceiver unit which is configured as a radio interface, preferably as an HF or LF or NFC (Near Field Communication) or UWB or WLAN (Wireless Local Area Network) or Bluetooth, particularly preferably as a Bluetooth Low Energy (BLE), interface, in order to provide vehicle communication, in particular networked with a plurality of different other vehicles. In this way, various communication technologies can be used for networking so that as many vehicles as possible can be considered as communication participants.

Furthermore, it is optionally provided that the transceiver arrangement is configured to receive device information via the vehicle communication about at least one further localization of the mobile device by the at least one further vehicle. In addition, it may be possible for the processing arrangement to be configured to perform a vehicle localization of the at least one further vehicle in order to localize the mobile device, in order to compare the device information with a result of the vehicle localization, in order to perform the localization of the mobile device itself indirectly using the device information. In other words, the other vehicle can first perform the further localization of the mobile device, for example, using device communication between the other vehicle and the mobile device. If necessary, a device response can also be received using this device communication of the other vehicle (as a slave vehicle). Information about the signal strength with which the device response was received by the other vehicle can be used for this further localization. A ToF analysis can also be performed for localization. The information about the signal strength and/or a result of the ToF analysis can be interpreted as information about the localization determined by the slave vehicle. This information is specific to the position of the mobile device relative to the rest of the vehicle. The device response and/or the localization information determined by the slave vehicle can then be transmitted in the form of device information by the further vehicle to the master vehicle by means of vehicle communication. The transmitted device information can be used by the master vehicle, in particular by the processing arrangement to perform the localization of the mobile device indirectly. Since the position relative to the further vehicle is given, it may be necessary to compare the device information with the result of the vehicle localization. The vehicle localization is performed, for example, on the basis of the vehicle communication, for example, by evaluating the signal strength and/or a ToF analysis. In this way, vehicle localization enables the position of the other vehicle relative to the master vehicle to be determined. This position can be used in the comparison to also determine the position of the mobile device relative to the master vehicle.

In addition, it is conceivable within the scope of the invention that the processing arrangement is configured to localize the mobile device and/or to localize the at least one further vehicle, to evaluate the vehicle communication and/or a device communication, the evaluation providing at least one of the following detections:

a distance measurement of a distance of the mobile device and/or the further vehicle relative to the vehicle,
a directional detection of a direction of the mobile device and/or the further vehicle relative to the vehicle, wherein preferably the evaluation for this purpose provides a signal evaluation, preferably measurement of a signal transit time and/or a signal strength, and/or a reception angle determination of a communication signal received by the vehicle communication and/or by the device communication. The communication signal is used, for example, to transmit the device information. The relative position to the vehicle can be reliably determined by means of distance measurement and direction detection. If this information is also available for other vehicles (e.g. relative to the mobile device) using the device information, the position of the mobile device relative to the vehicle can be determined very accurately.

It is also optionally conceivable that the vehicle is part of the security system, and the transceiver arrangement is arranged on the vehicle, in particular is firmly connected to the vehicle, and preferably several transceiver units of the transceiver arrangement are arranged at different positions on the vehicle in order to provide in each case the vehicle communication and/or a device communication in a position-specific manner. The use of different positions has the advantage that the accuracy of the localization can be improved by comparing the communication signals of different transceiver units.

It may also be possible for the processing arrangement to be configured to evaluate the vehicle communication and/or a device communication of at least one transceiver unit of the transceiver arrangement as a function of a position of the respective transceiver unit and thus in a position-specific manner, preferably by evaluating the signal strength at (communication signals) of the respective transceiver unit and/or by comparing different signal strengths at different transceiver units, in particular to perform a reception angle determination of a communication signal of the respective vehicle and/or device communication. In this way, knowing the positions of the transceiver unit on the vehicle enables the angle of the communication signals on the basis of the signal strength of the received communication signals to be determined. In this way, the accuracy of the localization can be improved.

A further advantage may be provided in that the transceiver arrangement is configured to provide a network, preferably a Bluetooth network, with the vehicle (master vehicle) and the at least one further vehicle (slave vehicle) in each case as participants of the network, in which in particular the transceiver arrangement of the vehicle is configured as a master of the network in order to control the communication of the network for the further participants. In this way, networked localization of the mobile device can be enabled.

It may optionally be possible for the mobile device to be a part of the security system, and to be configured as a mobile radio device, in particular a smartphone, or as a mobile identification device specific to the vehicle, and preferably configured to provide authentication on the vehicle for enabling and/or triggering a security-relevant vehicle function, preferably by transmitting a device response via a communication signal of the device communication. The device response comprises, for example, information for authentication, such as a code or information of a challenge-response or the like. If necessary, the device response can be transmitted to the vehicle via the vehicle communication. In addition, device information about the location of the vehicle can also be transferred using vehicle communication. This location was determined by the other vehicle by locating the mobile device.

The invention also relates to a vehicle, preferably a motor vehicle and/or passenger vehicle. The vehicle may have a security system, preferably a security system according to the invention, for locating a mobile device in a surrounding area of the vehicle. Specifically, the following components may be provided for in the vehicle or security system:
- a (particularly electronic) transceiver arrangement to provide vehicle communication of the vehicle (master vehicle) with at least one other vehicle (slave vehicle) in the surrounding area,
- a processing arrangement to perform the location of the mobile device at least partially based on the vehicle communication.

Thus, the vehicle according to the invention brings the same advantages as those described in detail with regard to a security system according to the invention.

The invention also related to a method for locating a mobile device by a vehicle (master vehicle) in a surrounding area of the vehicle.

It is intended that the following steps are performed, preferably one after the other (in the specified order) or in any order, whereby individual steps can also be performed repeatedly:
a) Provision of a vehicle communication of the vehicle with at least one further vehicle (slave vehicle) in the surrounding area, in particular by a transceiver arrangement of the vehicle,
b) performing the location of the mobile device at least partially on the basis of the vehicle communication, in particular by a processing arrangement of the vehicle Thus, the method according to the invention provides the same advantages as they have been described in detail with respect to a security system according to the invention. In addition, it may be provided that a security system according to the invention is provided for performing the method according to the invention, whereby in particular step a) is performed by the transceiver arrangement and/or step b) by the processing arrangement of the security system.

The method according to the invention advantageously provides for the implementation of the vehicle communication in the form of a networked communication with a plurality of other vehicles. In doing so, a further transmission (forwarding) of device information, in particular of a device response and/or of information on a further localization (localization information) of at least one of the further vehicles can take place via the vehicle communication. The information about the further localization comprises in particular information about a distance and/or a direction of the mobile device relative to the further vehicle. By using this device information with the master vehicle, the localization by the master vehicle can be improved, in particular if, in addition to the use of the device information, a separate localization of the mobile device is performed by the master vehicle. A range for the localization and/or reception of the device response can also be increased, as the localization and/or reception does not necessarily have to be performed directly by the master vehicle. Especially if the master vehicle and/or the other vehicles are configured as stationary (parked) vehicles, the localization can be further improved. In this case it is conceivable, for example, to average the acquired information over the further localization.

It may be possible that a learning phase is performed to capture the surrounding area of the vehicle. In this case, for example, a position of the other vehicles relative to the master vehicle is determined, i.e. an image of the surrounding area is recorded. Thereby, based on the surrounding area detection of the master vehicle, an exact position determination of the mobile device can be enabled, even in case of strong reflections of the communication signal (e.g. a Bluetooth low-energy signal) of the vehicle and/or device communication in the surrounding area or also in case of an unauthorized RSA (Relay Station Attack) extension.

It may be possible for the master vehicle to determine the position of the slave vehicles by means of distance measurement (e.g. by evaluating a signal strength or transit time measurement) and angle determination (e.g. determined by comparing the signal strengths during communication with different transceiver units of the master vehicle) during vehicle communication.

It may be possible, especially in the context of a method according to the invention, that the vehicle (master vehicle) has a monitoring arrangement to detect a request for access. The monitoring arrangement may, for example, have a proximity sensor, such as a capacitive sensor. This is arranged, for example, in the area of the tailgate or in the door handle to detect the approach of a user. This approach is then interpreted as an access request to initiate the security-relevant function. The detection of the access request can initiate the authentication, advantageously by transmitting an alarm signal to the mobile device. In this case, the mobile device can act as an ID transponder by transmitting a response signal when the alarm signal is received. This response signal can, if necessary, be received directly—that is, directly—by the vehicle via the device communication (as a device response) and/or be received by at least one other vehicle (also as a device response). This device response can include authentication information, such as a code or the like. However, to further increase security, the mobile device may be localized on the basis of the device response. For this purpose, distance measurement, in particular a runtime measurement or signal evaluation, of the response takes place to determine the distance of the mobile device to the vehicle (master and/or slave vehicle). In addition, a direction of the device response can be determined from which the device response was received by the vehicle (master and/or slave vehicle) or in which direction the mobile device is located. The distance and/or direction thus form location information (information about the location), which can be determined directly by the master vehicle via the direct device communication or by at least one further (slave) vehicle via the device communication. In order to improve the localization with the master vehicle, the vehicle communication can be used to transmit the localization information of the slave vehicle(s) to the master vehicle in the form of device information. In addition, the device information can also include the device response, e.g. for control by the master vehicle.

It is also conceivable that step (a) could comprise at least one of the following steps:
receiving at least one device information about a location of the mobile device relative to the at least one other vehicle, determined by the at least one other vehicle by means of at least one further localization of the mobile device,
receiving device information about the location of the mobile device relative to one of the other vehicles, determined by another vehicle by means of a further location of the mobile device, and transferred via at least one of the other vehicles,
receiving a device response containing mobile device authentication information, received directly from the mobile device by the or one of the other vehicles, and optionally forwarded via at least one of the other vehicles via another vehicle communication,
transmitting an alarm signal to the mobile device to initiate transmission of the device response by the mobile device to the at least one other vehicle,
whereby reception can take place via the vehicle communication. This has the advantage that the device information can not only be determined directly at the master vehicle, but can also be determined by other vehicles and be provided to the master vehicle to improve localization.

Furthermore, it may be provided within the scope of the invention that the vehicle in the form of a master vehicle generates a network with the other vehicles each as slave vehicles, in at least one of the slave vehicles:
device information (including location information) about a location of the mobile device is determined, and/or
a device response is received from the mobile device,
and each being transferred among each other to transmit the device information and/or device response to the master vehicle via the vehicle communication, thereby increasing the range of the master vehicle for locating the mobile device and/or receiving the device response. If necessary, the device response can also be transmitted as part of the device information.

It may optionally be possible that step b) includes at least one of the following steps:
direct location of the mobile device by the vehicle to provide direct device information about a location of the mobile device relative to the vehicle,
indirect location of the mobile device by evaluating indirect device information received through the vehicle communication, preferably the indirect device information being specific to the location of the mobile device relative to the at least one further vehicle,
comparing the received, indirect device information with the direct device information in order to perform the localization, preferably to increase the accuracy of the localization and/or to check the plausibility of the location
performing a distance measurement of a distance of the mobile device and/or the further vehicle relative to the vehicle,
performing a directional detection of a direction of the mobile device and/or the further vehicle relative to the vehicle,
evaluating a communication signal of the vehicle communication and/or the device communication for distance measurement, preferably by signal evaluation, especially preferably measuring a signal transmit time and/or signal strength,
evaluating a communication signal of the vehicle communication and/or the device communication for direction detection, preferably by means of a reception angle determination, in particular by a position-specific evaluation of different signal strengths at different transceiver units of the vehicle.

Thus, localization by the vehicle can be improved by using vehicle communication.

BRIEF DESCRIPTION OF THE SEVERAL VIEWS OF THE DRAWINGS

Further advantages, features and details of the invention are given in the following description, in which, with reference to the drawings, embodiments of the invention are described in detail. The features mentioned in the claims and in the description may be each essential to the invention individually or in any combination. Is shown in:

DESCRIPTION OF SPECIFIC EMBODIMENTS OF THE INVENTION

Figure 1:
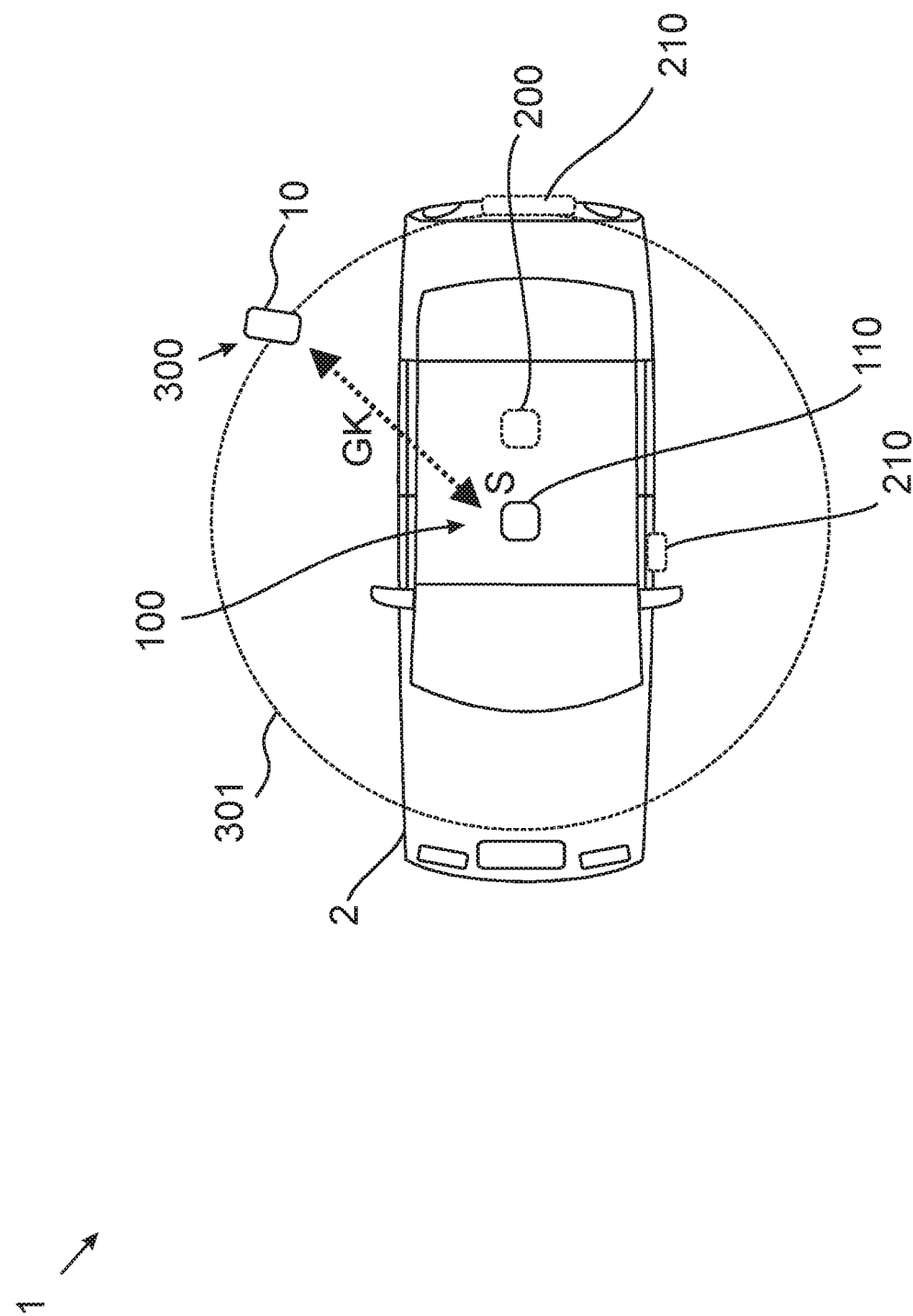
FIG. 1 A schematic top view of a vehicle with a security system with a transceiver unit according to the invention, FIG. 2 Additional schematic top view of a vehicle with a security system according to the invention with two transceiver units, FIG. 3 An additional schematic top view of a vehicle with a security system according to the invention with more than two transceiver units, FIG. 4 An additional schematic top view of a vehicle with a security system according to the invention to illustrate a disturbance of communication, FIGS. 5, 6 and 7 further schematic top views of a vehicle with a security system according to the invention and other vehicles to illustrate networked communication, In the following figures, the identical reference signs are used for the same technical characteristics even from different embodiments.

FIGS. 1 to 7 show a top view of a vehicle 2—the master vehicle—which has a security system 1 in accordance with the invention. Accordingly, security system 1 is suitable for integration into vehicle 2 in order to localize a mobile device 10 in a surrounding area of vehicle 2. For this purpose, the security system 1 comprises a transceiver arrangement 100 in order to provide a vehicle communication FK of the vehicle 2 with at least one further vehicle 2'—the slave vehicle—in the surrounding area. This possibility for vehicle communication FK is shown in FIGS. 4 to 7. Furthermore, security system 1 comprises a processing arrangement 200 to perform the localization of the mobile device 10 at least partially based on the FK vehicle communication.

Figure 2:
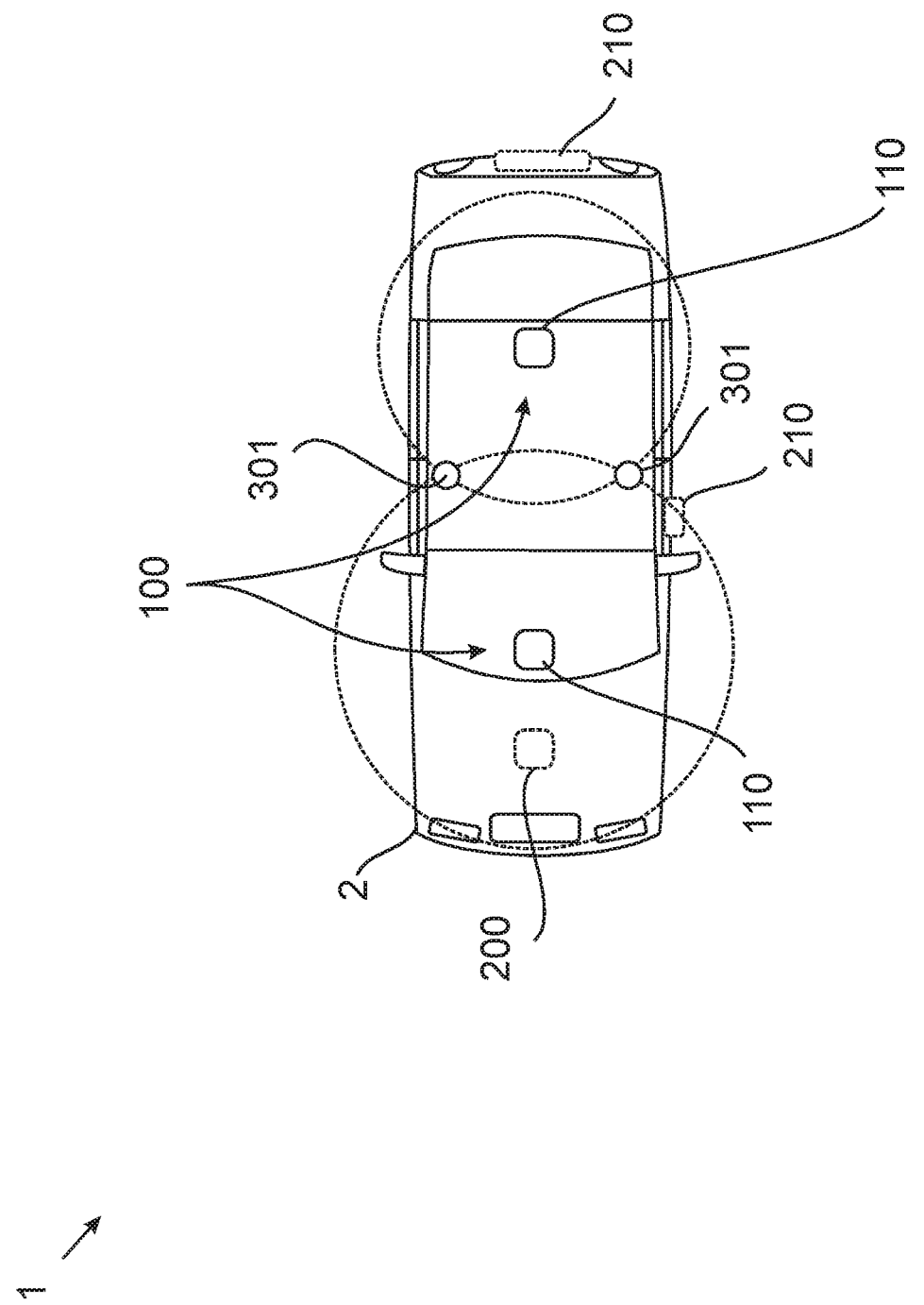
Figure 3:
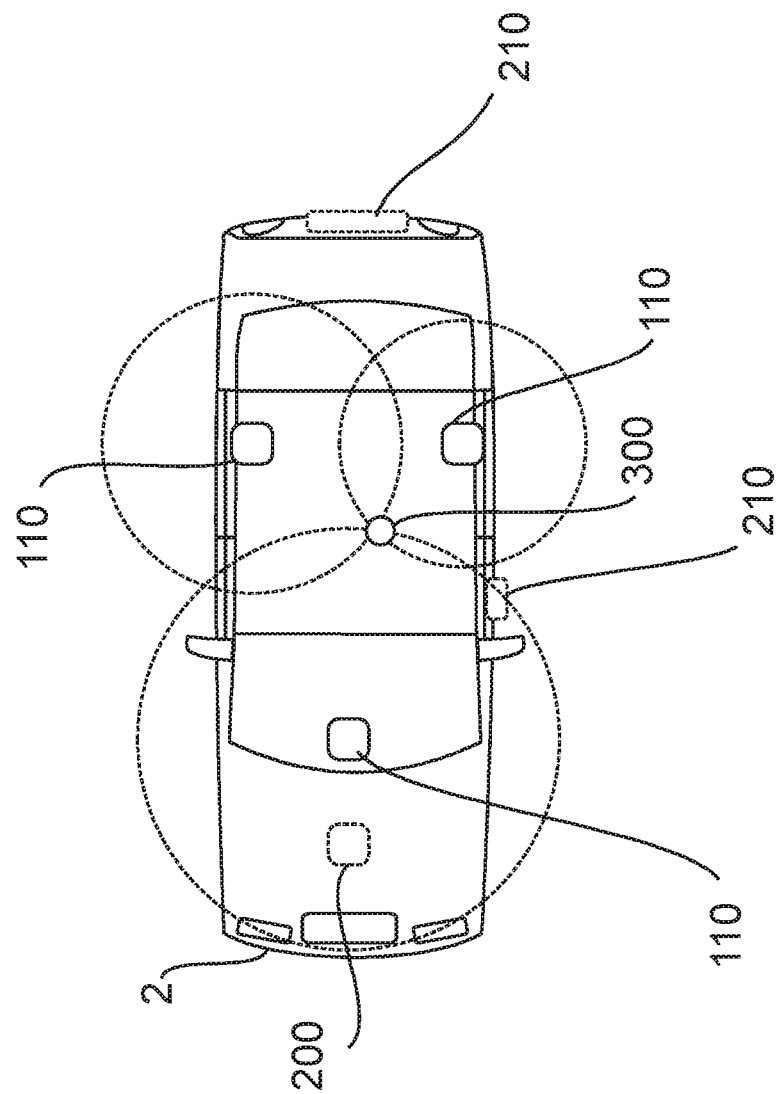

As illustrated in FIGS. 1 to 3, the transceiver arrangement 100 can also be configured for direct device communication GK of the vehicle 2 with the mobile device 10, whereby the processing arrangement 200 is in data communication with the transceiver arrangement 100 in order to directly locate the mobile device 10 using the device communication GK, and possibly also in order to perform at least one of the following functions for the location using the vehicle communication FK:

Plausibility check of the direct localization,
Supplementing and/or correcting the direct localization to increase the accuracy of the localization
indirect location of the mobile device 10 via the at least one other vehicle 2'.

If, as shown in FIG. 1, the transceiver arrangement 100 has only a single transceiver 110 (satellite), the location of the mobile device 10 may be relatively inaccurate. By locating the mobile device 10 directly using the device communication GK, the information that the mobile device 10 is at a certain distance from vehicle 2 can then be determined. However, since no directional information is determined, the localization provides a large number of possible locations 301 of the mobile device 10. The distance determined is visualized by a dashed circle that represents the possible locations 301 of the mobile device 10. For example, the dashed line is an equipotential line that represents a certain signal strength of the device communication GK. The signal strength of a communication signal S of the device communication GK is therefore dependent on the distance of the mobile device 10 from the transceiver unit 110.

The information about the distance may be sufficient to ensure authentication of the mobile device. However, in order to determine the exact location 300 of the mobile device 10, or to check the plausibility of the determined distance, the vehicle communication FK can be used additionally for localization. In this way, the authentication security can be further improved.

FIGS. 2 and 3 are intended to further illustrate the principle in which the use of further transceiver units 110 (of the master vehicle 2, alternatively or additionally also further transceiver arrangements 100' of the slave vehicles 2', then provided by the vehicle communication FK) can improve localization. Thus, when using two transceiver units 110 according to FIG. 2, the possible location 301 of the mobile device 10 can already be clearly limited. The use of at least three transceiver units 110 in FIG. 3 can even provide the exact location 300 of mobile device 10. This requires that the localizations by the individual transceiver units 110 (e.g. the information about the respective signal strength) are compared with each other, e.g. by the processing arrangement 200. Functionally, the exact position 300 of the mobile device 10 can also be determined, as already mentioned, by transmitting localization information about further localizations of the mobile device 10 by further vehicles 2' via the vehicle communication FK to the master vehicle 2, where they are compared with each other like the localizations by the individual transceiver units 110.

Furthermore, as shown in FIGS. 1 to 3, it may be possible for vehicle 2 (master vehicle) to have a monitoring arrangement 210 to detect a request for access. In this case, the monitoring arrangement 210 may have, for example, a proximity sensor, such as a capacitive sensor. This is arranged, for example, in the area of the tailgate (e.g. in the bumper) or in the door handle to detect the approach of a user. This approach is then interpreted as a request for access in order to initiate the security-relevant function.

Figure 4:
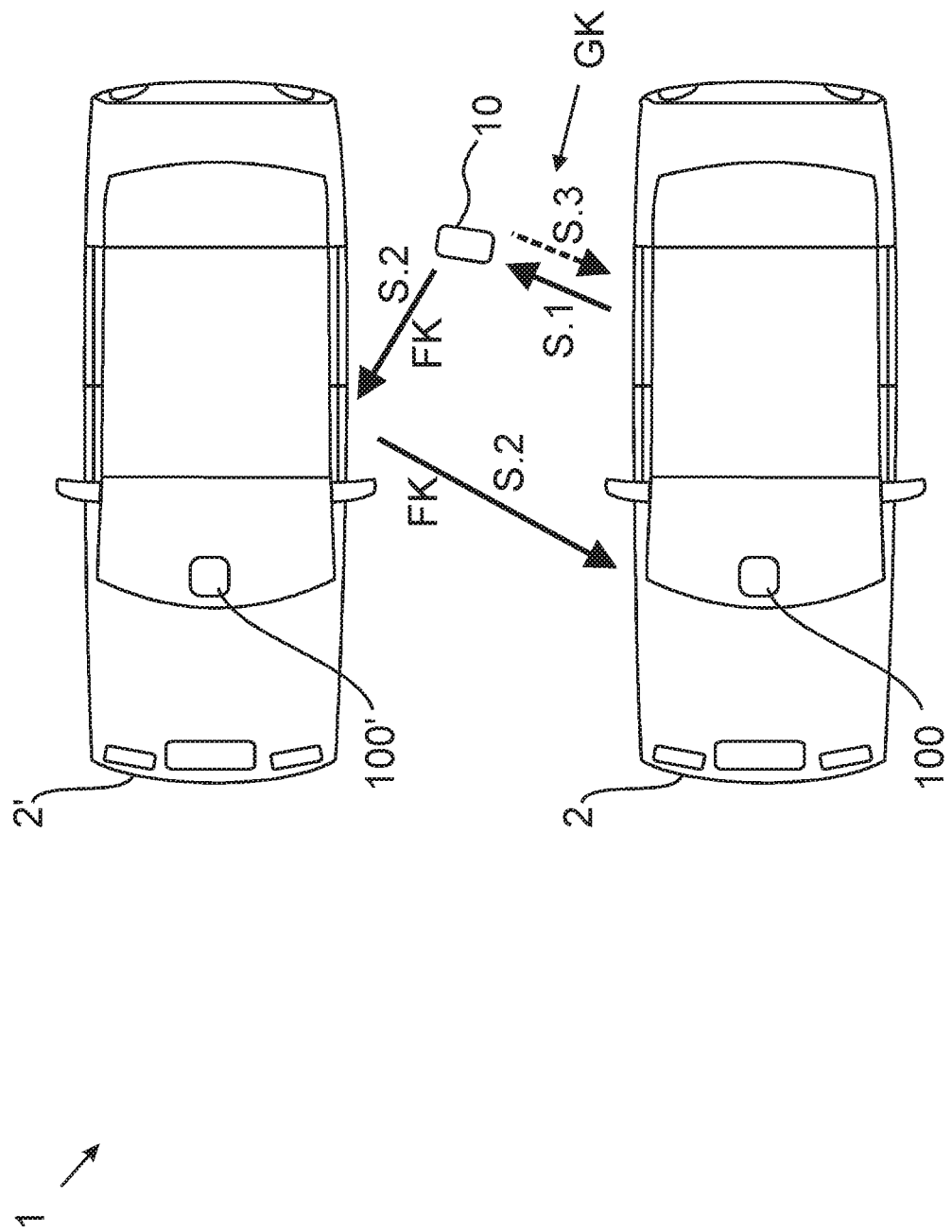

FIG. 4 shows that the detection of the access request can initiate authentication, advantageously by transmitting a request signal S.1, in particular an alarm signal S.1, to the mobile device 10, in which case the mobile device 10 can act as an ID transponder by transmitting a response signal S.2 when the request signal S.1 is received. This response signal S.2 can basically be received via the device communication GK directly—i.e. directly—by vehicle 2 (as device response) and/or by at least one other vehicle 2' (also as device response). This device response can include authentication information, such as a code or the like.

However, it is possible that the other vehicles 2', e.g. moving and parking vehicles 2', may interfere with the device communication GK. In this case the response signal S.2 is transmitted to vehicle 2 as a disturbed signal S.3. In order to still perform the authentication and/or localization of the mobile device 10, one of the other vehicles 2' in the surrounding area can also receive the response signal S.2. This can be transferred to vehicle 2 via vehicle communication FK.

Figure 5:
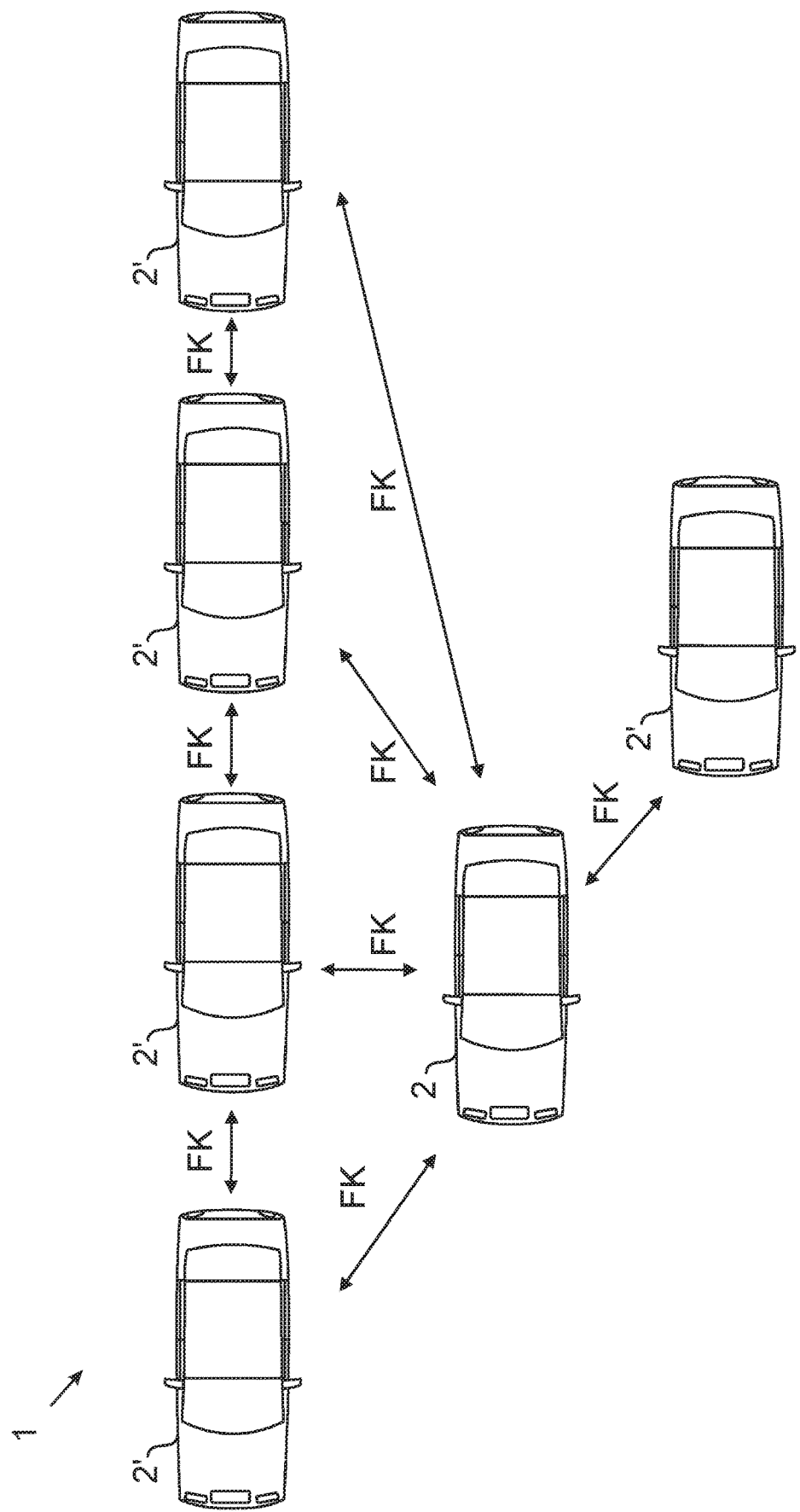

According to FIG. 5, this principle can be extended by the fact that the vehicle communication FK is not only performed between another vehicle 2' and vehicle 2, but that a networked transmission between several vehicles 2' takes place. Each of the vehicles 2, 2' can thereby acquire an image of its surrounding area by evaluating the FK vehicle communication with the other vehicles. Thus, each of the vehicles 2, 2' can also localize its neighboring vehicles 2, 2' via the vehicle communication FK (e.g. via the signal strength or a ToF analysis). Since there is no change in position for parked vehicles 2, 2', several localizations can be averaged to improve accuracy. It is also possible to determine the angle or direction during localization for each vehicle if the vehicle has more than one transceiver 110.

Figure 6:
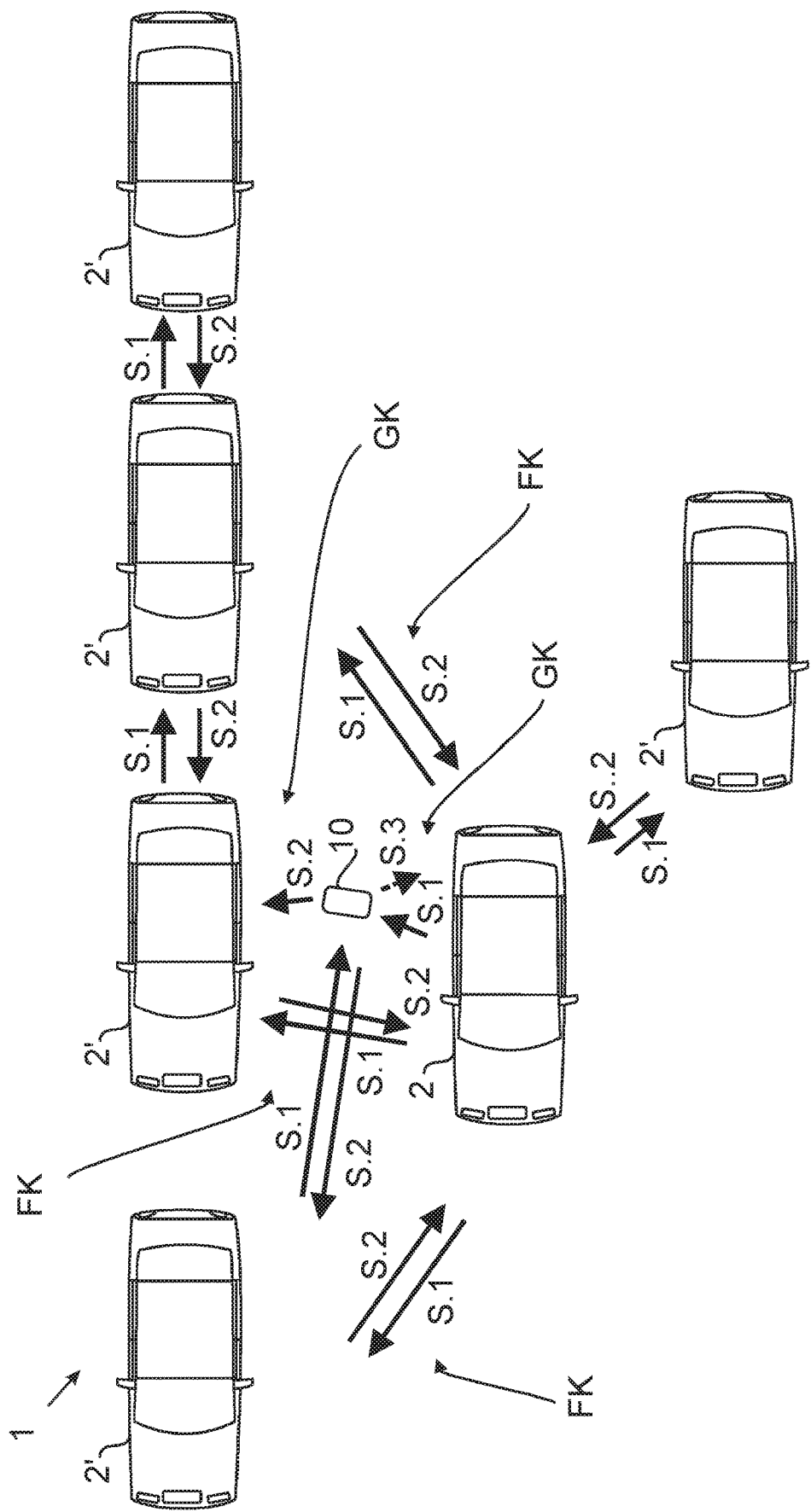

According to FIG. 6, the networked transmission may comprise a transmission of the response signal S.2, but alternatively or additionally also the transmission of a device information about at least one further localization of the mobile device 10 by the at least one further vehicle 2'. By transmitting the response signal S.2, vehicle 2 can detect this response signal S.2 even if it is actually outside the communication range of the mobile device 10. Thus, the other vehicles 2' offer an extension of the signal transmission.

FIG. 7 shows that networked transmission can also enable the authentication to be secured by vehicle 2. In particular, a relay station attack can be used to attempt to use the RSA extension S.4 to transmit the response signal S.2 from mobile device 10 to vehicle 2 even over distances that are not actually intended for authentication. Localization via vehicle communication FK can prevent this, as the distance to vehicle 2 can be determined very reliably in this way.

The above explanation of the embodiments describes the present invention exclusively in the scope of examples. Of course, individual features of the embodiments can be freely combined with each other, if technically reasonable, without leaving the scope of the present invention.

LIST OF REFERENCE SIGNS

1 Security system
2 Vehicle, master vehicle
10 Mobile device, identification transponder, mobile radio
2' Other vehicle, slave vehicle
100 Transceiver arrangement
110 Transceiver unit, Bluetooth interface
200 Processing arrangement
210 Monitoring arrangement 300 Location of the mobile device
301 Possible locations of the mobile device
100' Further transceiver arrangement
FK Vehicle communication
GK Device Communication
S Communication signal
S.1 Request signal, alarm signal
S.2 Response signal
P.3 Disturbed signal
P.4 RSA extension

What is claimed is:

1. A security system for a vehicle, for locating and authenticating a mobile device in a surrounding area of the vehicle, comprising:
 a transceiver arrangement for providing a vehicle communication of the vehicle with at least one other vehicle in the surrounding area,
 wherein the transceiver arrangement is configured to perform an authentication by a communication of the transceiver with the mobile device to initiate a security-relevant function of the vehicle,
 request a device information of the mobile device from the at least one other vehicle, wherein the device information of the mobile device includes a device response signal, which is transmitted in response to an alarm signal sent by at least the vehicle or the at least one other vehicle,
 a processing arrangement for performing the localization of the mobile device at least partially on the basis of the vehicle communication, wherein the localization of the mobile device ensures the authentication.

2. The security system according to claim 1, wherein, the transceiver arrangement is additionally configured for direct device communication between the vehicle and the mobile device, the processing arrangement being in data communication with the transceiver arrangement in order to directly locate the mobile device on the basis of the device communication, and in order to perform at least one of the following functions for the location on the basis of the vehicle communication:
 Plausibility check of the direct localization,
 At least supplement or correct the direct localization to increase the accuracy of the localization,
 Indirect localization of the mobile device via the at least one other vehicle.

3. The security system according to claim 1, wherein, the transceiver arrangement has at least one transceiver unit which is configured as a radio.

4. The security system according to claim 1, wherein, the transceiver arrangement is configured to receive device information via the vehicle communication about at least one further location of the mobile device by the at least one further vehicle, and
 the processing arrangement is configured to perform a vehicle localization of the at least one further vehicle in order to localize the mobile device, in order to compare the device information with a result of the vehicle localization, in order to perform the localization of the mobile device itself indirectly using the device information.

5. The security system according to claim 1, wherein, the processing arrangement is configured to at least localize the mobile device or to locate the at least one other vehicle, to evaluate at least the vehicle communication or a device communication, the evaluation providing at least one of the following detections:
 at least a distance measurement of a distance of the mobile device or the further vehicle relative to the vehicle,
 at least a direction detection of a direction of the mobile device or the further vehicle relative to the vehicle.

6. The security system according to claim 1, wherein, the vehicle is part of the security system, and the transceiver arrangement is arranged on the vehicle.

7. The security system according to claim 1, wherein, the processing arrangement is configured to evaluate at least the vehicle communication or a device communication of at least one transceiver unit of the transceiver arrangement as a function of a position of the respective transceiver unit and thus in a position-specific manner.

8. The security system according to claim 1, wherein, the transceiver arrangement is configured to provide a network with the vehicle and the at least one further vehicle each as a participant of the network, in which the transceiver arrangement of the vehicle is configured as a master of the network in order to control the communication of the network for the further participants.

9. The security system according to claim 1, wherein, the mobile device is a part of (Currently Amended) The security system and is configured as a mobile radio device or as a mobile identification device specific to the vehicle, and is configured to provide an authentication on the vehicle for at least enabling or triggering a security-relevant vehicle function.

10. A vehicle comprising the security system for locating a mobile device in a surrounding area of the vehicle according to claim 1.

11. A method for locating and authenticating a mobile device by a vehicle in a surrounding area of the vehicle, whereby the following steps are performed:
 a) Provision of a vehicle communication of the vehicle with at least one further vehicle in the surrounding area, comprising: receiving at least one piece of device information about a location of the mobile device relative to the at least one further vehicle, determined by the at least one further vehicle by means of at least one further location of the mobile device,
 b) Performing the localization of the mobile device at least partially by means of the vehicle communication;
 c) Authenticating the mobile device to initiate a security-relevant function of the vehicle, wherein the authentication is at least partially based on the localization of the mobile by means of the vehicle communication.

12. The method according to claim 11, wherein, step a) comprises at least one of the following steps:
 Receiving device information about a location of the mobile device relative to one of the further vehicles, determined by the one further vehicle by means of a further localization of the mobile device, and transferred via at least one other of the further vehicles,
 Receiving a device response with authentication information of the mobile device, which is received directly by the or one of the further vehicles from the mobile device, and optionally transferred via at least one other of the further vehicles via a further vehicle communication,
 transmitting an alarm signal to the mobile device to initiate transmission of the device response by the mobile device to the at least one other vehicle,
 where reception is in each case via the vehicle communication.

13. The method according to claim 11, wherein, the vehicle in the form of a master vehicle generates a network with the other vehicles each as slave vehicles, in which at least one of the slave vehicles:
- at least device information about a location of the mobile device is determined, or
- a device response is received from the mobile device, and in each case being transferred among each other in order to transmit at least the device information or device response to the master vehicle via the vehicle communication, in order to thus increase the range of the master vehicle for at least locating the mobile device or receiving the device response.

14. The method according to claim 11, wherein, step b) comprises at least one of the following steps:
- Direct location of the mobile device by the vehicle to provide direct device information about a location of the mobile device relative to the vehicle,
- Indirect localization of the mobile device by evaluating indirect device information received by the vehicle communication,
- comparing the received indirect device information with the direct device information in order to perform the localization,
- Performing a distance measurement of a distance of at least the mobile device or the further vehicle relative to the vehicle,
- Performing a directional detection of a direction of at least the mobile device or the further vehicle relative to the vehicle
- Evaluation of a communication signal of at least the vehicle communication or the device communication for distance measurement,
- Evaluation of a communication signal of at least the vehicle communication or of the device communication for direction detection.

15. The method according to claim 11, wherein, a security system for a vehicle, for locating a mobile device in a surrounding area of the vehicle, comprising a transceiver arrangement for providing vehicle communication of the vehicle with at least one other vehicle in the surrounding area, a processing arrangement for performing the localization of the mobile device at least partially on the basis of the vehicle communication is provided for performing the method.

16. The method according to claim 15, wherein, at least step a) being performed by the transceiver arrangement or step b) being performed by the processing arrangement of the security system.

17. The security system according to claim 1 for integration into the vehicle.

18. The security system according to claim 3, wherein, the transceiver arrangement has at least one transceiver unit which is configured as a Bluetooth low-energy interface, in order to provide the vehicle communication with a plurality of different further vehicles.

19. The security system according to claim 7, wherein, to perform a reception angle determination of a communication signal of at least the respective vehicle or device communication.

20. The method according to claim 14, wherein, step b) comprises evaluation of a communication signal of the vehicle communication or of the device communication for the directional detection by a position-specific evaluation of different signal strengths at different transceiver units of the vehicle.

* * * * *